United States Patent Office 2,908,006
Patented Oct. 6, 1959

2,908,006

COMPLEX ESTERS

Sylvan O. Greenlee, Racine, Wis., assignor to
S. C. Johnson & Son, Inc., Racine, Wis.

No Drawing. Application June 9, 1955
Serial No. 514,378

13 Claims. (Cl. 260—18)

This invention relates to a new class of synthetic esters prepared from an unsaturated aliphatic acid and a polyhydric phenol. More particularly, this invention relates to a novel synthetic polyester prepared by esterifying with an unsaturated acid the phenolic hydroxyl groups of a polyhydric phenol which is the self-ester of an aryloxy substituted acid.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Long-chain unsaturated acids containing at least about 10 carbon atoms constitute suitable plasticizers. These materials also are desirable because of the conversion characteristics imparted due to their unsaturation. The present invention embraces the production of the esters of such acids and polyhydric phenols. By esterifying the hydroxyl groups of the phenols with converting or plasticizing acids, products having a wide variety of properties may be obtained. Products of this type dissolved in an organic solvent form coating compositions which, on air drying, polymerize through the unsaturated groups to form flexible tack-free films.

The present compositions provide a chemical union in each molecule of one or more plasticizing or converting groups together with a resinous group which has been tailored to suit a particular need. The resinous polyhydric phenol herein contemplated is a compound such as that disclosed in the copending Greenlee application, Serial No. 514,377 of even date entitled "Resinous Polyhydric Phenols." These materials, having controlled physical characteristics are the self-esters derived from an hydroxyaryl-substituted aliphatic acid. Such compositions may be prepared, for example, by heating 4,4-bis(4-hydroxyphenyl)-pentanoic acid in the presence of acetic anhydride, as illustrated by the following:

(I)

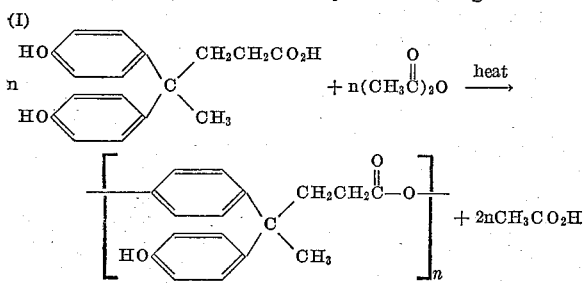

It is to be understood that the product of the illustrative reaction is only one of a mixture of materials actually produced. Further valuable variations in the type of composition obtained may be effected by varying the number of carboxyl groups esterified, resulting in resinous polyhydric phenols containing a desired amount of unreacted carboxylic acid. To illustrate this type of composition, the reaction between 2 molecules of 4,4-bis(4-hydroxyphenyl)-pentanoic acid results in an essentially resinous triphenolic acid.

(II)

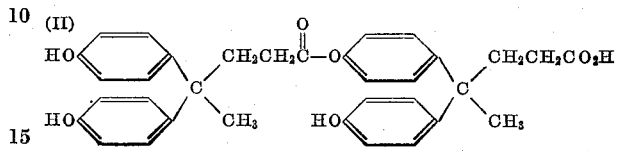

The aryloxy-substituted acid contemplated for use in preparing the desired resinous polyhydric phenols should have two hydroxyphenyl groups attached to a single carbon atom. The preparation of such an aryloxy acid is most conveniently carried out by condensing a keto-acid with the desired phenol. Experience in the preparation of bisphenols and related compounds indicates that a carbonyl group of the keto-acid must be located next to a terminal carbon atom in order to obtain satisfactory yields. Prior applications, Serial Nos. 464,607 and 489,300, filed October 25, 1954 and February 18, 1955 respectively, disclose a number of illustrative compounds suitable for use as the aryloxy-substituted acid and methods of preparing the same. These materials, which are referred to for convenience as Diphenolic Acid, or DPA, consist of the condensation products of levulinic acid and phenol, substituted phenols, or mixtures thereof. It is to be understood that the phenolic nuclei of the Diphenolic Acid may be substituted with any groups which will not interfere with the esterification reactions. For example, the nuclei may be alkylated with alkyl groups of from 1–5 carbon atoms as disclosed in Serial No. 489,300 or they may be halogenated.

The resinous polyhydric phenols are prepared by self-esterification of up to one-half the phenolic hydroxyl groups of Diphenolic Acid with the carboxyl group of other molecules of Diphenolic Acid. Partial esterification to give products having appreciable acid values, such as that represented by II above, may be carried out by heating at temperatures of from 190–275° C. under conditions whereby water of esterification is readily removed. The water removal may be facilitated by bubbling inert gas through the reaction mixture during esterification or by azeotropic distillation with a hydrocarbon solvent. Convenient methods of esterification of the phenolic hydroxyl groups involve heating the Diphenolic Acid in the presence of acetic anhydride in an amount equivalent to the extent of esterification desired. For example, if it is desired to self-esterify approximately one-half of the carboxyl groups, one-half mol of acetic anhydride per mol of Diphenolic Acid should be used. If approximately complete self-esterification of the carboxyl groups is desired, at least 1 mol of acetic anhydride per mol of Diphenolic Acid should be used. Where more than the equivalent amount of acetic anhydride is used in the process, a portion of the phenolic hydroxyl groups not esterified by the carboxyl group of the Diphenolic Acid are acetylated. In some cases, it is desirable that a portion or even all of the phenolic hydroxyl groups not used in self-esterification be acetylated since the acetates are valuable in acid replacement reactions with high molecular weight acids to form high molecular weight esters. For example, 1 mol of a Diphenolic Acid might be treated with at least 2 mols of acetic anhydride to give complete self-esterification and also acetylation of the excess phenolic hydroxyl groups. This product could then be treated at high temperatures with undecylenic acid to replace the acetate groups, forming the undecylenic ester of the resinous polyhydric phenol.

The resinous polyhydric phenols may also be prepared by converting the carboxyl group of the Diphenolic Acid to an acid chloride which immediately reacts with the phenolic hydroxyl groups of the Diphenolic Acid. This reaction results in the liberation of HCl and takes place immediately upon conversion of the carboxyl group to the acid chloride. Incomplete esterification of the carboxyl groups of the Diphenolic Acid may be effected by regulating the amount of acid chloride-forming reagent used in treatment of the Diphenolic Acid.

The following examples describe the preparation of the self-esters herein disclosed. Softening points as used herein were determined by the Durrans' Mercury Method (Journal of Oil & Colour Chemists' Association, 12, 173–175 [1929]). Acid values as used herein are defined as the number of milligrams of potassium hydroxide equivalent to the free acid contained in a one-gram sample. Proportions expressed are parts by weight unless otherwise indicated.

EXAMPLE I

*Polyhydric phenol prepared by completely self-esterifying DPA*

A mixture of 286 parts of the Diphenolic Acid prepared from phenol and levulinic acid, 200 parts of glacial acetic acid, and 102 parts of acetic anhydride in a 3-neck flask provided with a thermometer, a mechanical agitator, and a reflux condenser was heated with continuous agitation raising the temperature to 130° C. over a period of about 20 minutes at which time removal of the acetic acid by distillation was begun. With continued agitation and removal of the acetic acid the temperature was increased to 212° C. over a period of 2 hours and held at 212–220° C. for 4½ hours, finally heating in the range of 220–240° C. for a period of 2 hours. During the last ½ hour of heating a water leg vacuum of around 30 mm. was applied to remove the last traces of acetic acid. The product had an acid value of 4.5 and a softening point at 137° C.

EXAMPLE II

*Polyhydric phenol prepared by the incomplete self-esterification of DPA*

A mixture of 286 parts of the Diphenolic Acid prepared from phenol and levulinic acid, 100 parts of acetic acid, and 76½ parts of acetic anhydride was treated in a similar manner as in Example I to give a product having an acid value of 58 and a softening point of 120° C.

EXAMPLE III

*Polyhydric phenol prepared by the incomplete self-esterification of DPA*

The Diphenolic Acid prepared from phenol and levulinic acid was heated in an open reaction vessel with continuous agitation of 200–212° C. for a period of 5 hours to give a solid resin having an acid value of 110.

The long-chain acid esters herein contemplated are prepared from the above resinous polyhydric phenols and unsaturated mono-carboxylic acids of at least about 10 carbon atoms. Preparation of the subject esters may be effected by two different procedures. The first of these involves the esterification of the phenolic hydroxyl groups of the resinous polyhydric phenol prepared as illustrated in Equation I hereinabove. For example, the reaction of such a phenol with linoleic acid in the presence of acetic anhydride would proceed as follows:

(III)

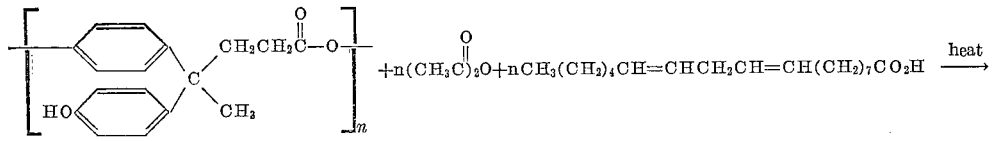

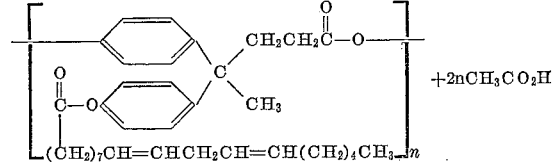

The alternate method for producing the resinous synthetic esters of this invention consists of co-esterifying mixtures of the Diphenolic Acid with the desired long-chain unsaturated mono-carboxylic aliphatic acid. The one-step reaction is illustrated by the following equation wherein linoleic acid and 4,4-bis(4-hydroxyphenyl)-pentanoic acid are employed.

(IV)

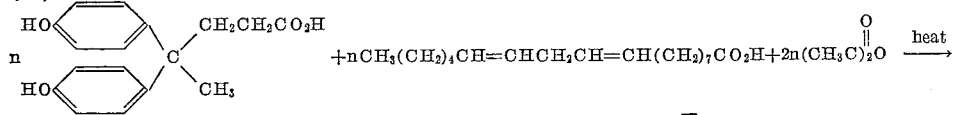

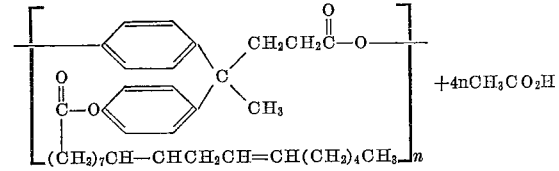

It is to be understood that the illustrated reaction produces mixtures of products since the two phenolic hydroxyl groups of each Diphenolic Acid molecule will not in all instances be esterified as shown. Both groups may be esterified by molecules of the long-chain unsaturated acid or by the carboxyl groups of other Diphenolic Acid molecules. This invention includes the esters containing any number of monomeric units. Thus, in Equation I, III, and IV above, $n$ may represent any integer greater than 1. As a practical consideration, however, it should be noted that compositions having more than about 15 units are characterized by their insolubility and infusibility, rendering them difficult to separate from impurities.

The long-chain acids which are contemplated for use in preparing the synthetic esters of this invention include the unsaturated monocarboxylic acids of at least about 10 carbon atoms and mixtures thereof. Illustrative of such acids are the drying oil fatty acids which normally contain from 18 to 22 carbon atoms such as acids obtained by the saponification of naturally-occurring unsaturated vegetable oils including Chinawood oil, oiticica oil, linseed oil, soyabean oil, corn oil, and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by other synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Lower molecular weight unsaturated acids may also be used if only air-drying characteristics are desired, but those containing less than about 10 carbon atoms contribute little plasticization. An example of one of the lower plasticizing acids contemplated is undecenoic acid, a commercially available material, a decomposition product of castor oil acids.

Esterification of the phenolic hydroxyl groups of the resinous polyhydric phenols may be carried out by any of the processes known in the art. A convenient method of preparing the long-chain esters consists of carrying out esterification in the presence of acetic anhydride in an amount equivalent to the amount of long-chain acid employed. In this case, mixed anhydrides of acetic anhydride and the long-chain acids are formed in the process together with the phenyl acetates of the resinous polyhydric phenol. On the application of heat at temperatures above the boiling point of acetic acid, the long-chain acid esters of the phenols are formed while acetic acid and unreacted acetic anhydride are removed by distillation. In some instances, it may be desirable first to form the acetates of the resinous polyhydric phenol by treatment with acetic anhydride before adding the long-chain unsaturated acid for acetic acid displacement. As a further alternative, it may be desirable to prepare the subject synthetic esters by coesterifying mixtures of the Diphenolic Acid and the long-chain unsaturated acids in the presence of acetic anhydride in an amount equivalent to the combined carboxylic acid content of the Diphenolic Acid and the long-chain unsaturated aliphatic acid, as illustrated by Equation IV above. An additional method of preparation consists of converting the long-chain acids to acid chlorides, and using the latter for direct reaction with the phenolic hydroxyl groups of the resinous polyhydric phenol, thus liberating HCl as esterification proceeds.

The synthetic esters of this invention constitute unique compositions, containing within each molecule in chemical union, an unsaturated residue of the plasticizing type as well as an aromatic portion which contributes resinous characteristics. The plasticizing portion of the ester, because of its unsaturation, also imparts polymerization characteristics, facilitating drying of the compositions on exposure to air or by the application of heat. The heat-conversion characteristics make the subject compositions valuable for use in coatings, adhesives and molding resins.

The following examples illustrate the long-chain unsaturated acid-polyhydric phenol esters of this invention. These embodiments are not intended to limit the invention, and should not be so construed. Quantities of materials expressed refer to parts by weight unless otherwise indicated.

EXAMPLE IV

*Esterification of resinous polyhydric phenol of Example I with oleic acid*

A mixture of 57 parts of the polyhydric phenol of Example I and 25 parts of acetic anhydride in a 3-neck flask provided with a thermometer, a mechanical agitator, and reflux condenser was heated at 135° C. for a period of 45 minutes. To this mixture 51 parts of oleic acid were added. The reflux condenser was turned downward for collection of the distillate and inert gas was introduced. The continuously agitated mixture was raised to 220° C. and maintained at 220–250° C. for a period of 3 hours. During this time the acetic acid was collected. This product had an acid value of 3.9.

EXAMPLE V

*DPA co-esterified with soya fatty acids*

A mixture of 143 parts of a Diphenolic Acid prepared from phenol and levulinic acid and 122 parts of acetic anhydride in a 3-neck flask provided with a thermometer, a mechanical agitator, and reflux condenser was heated at 135° C. for a period of 1 hour. To this mixture 104 parts of soya fatty acids were added. The reflux condenser was turned downward for collection of the distillate and inert gas was introduced. The continuously agitated mixture was raised to 220° C. and maintained at 220–250° C. for 5 hours, during which time the acetic acid was collected. This product had an acid value of 12.9 and a softening point of 58° C.

This product had a viscosity of T (Gardner Bubble Viscosimeter) and a color of 16 (Gardner-Holdt Color Scale), when dissolved in heavy naphtha (boiling range 145–225° C. and having an aniline point of 60° C.), to a 30% nonvolatile content. This product treated with .03% cobalt drier (based on nonvolatile content) and spread on glass panels with .002″ film thickness applicator gave a tack-free film on air-drying overnight. Hard, flexible films are also obtained by baking for 10 minutes at 150° C. The air-dried film was unaffected after 5 hours in boiling water and also after 45 minutes in 5% aqueous sodium hydroxide at room temperature. The baked film was unaffected after 96 hours in 5% aqueous sodium hydroxide at room temperature. The baked film was also unaffected after 1 hour in boiling toluene. It withstood 1 hour in ethyl alcohol, 30 minutes in glacial acetic acid, 10% aqueous ammonium hydroxide, and diethyl ether.

EXAMPLE VI

The procedure of Example V was repeated except that only 70 parts of soya fatty acids were used, producing a product having an acid value of 31.5 and a softening point of 82° C. This product was dissolved in xylene to a 30% nonvolatile content and spread in .002″ wet film thickness. The film became tack-free within 20–30 minutes at room temperature. The same films, converted by heated treatment for a period of 10 minutes at 150° C. were unaffected by 3 hours' exposure to boiling water.

EXAMPLE VII

In a similar manner the same amount of Diphenolic Acid as used in Examples V and VI was treated with 35 parts of soya fatty acids to produce a product having an acid value of 13 and a softening point of 105° C. Thin films of this product dried to tack-free products at room temperature in 15–20 minutes.

EXAMPLE VIII

*DPA co-esterified with dehydrated castor oil acids*

A mixture of 143 parts of a Diphenolic Acid prepared from phenol and levulinic acid and 122 parts of acetic anhydride in a 3-neck flask provided with a thermometer, a mechanical agitator, and a reflux condenser was heated with continuous agitation at 135° C. for 1 hour. To this mixture 104 parts of dehydrated castor oil acids were added. The reflux condenser was turned downward for collection of the distillate and inert gas was introduced. The continuously agitated mixture was heated to 218° C. and maintained at 218–242° C. for a period of 2 hours, during which time acetic acid formed during the reaction was collected. The product had an acid value of 6 and a softening point of 110° C.

This product had a viscosity of K (Gardner Bubble Viscosimeter) and a color of 12 (Gardner-Holdt Color Scale), when dissolved in a mixture composed of equal parts of heavy naphtha (boiling range 145–225° C. and having an aniline point of 60° C.) and commercial xylol to a 30% nonvolatile content. This solution was treated with .03% cobalt drier (based on nonvolatile content) and spread on glass panels with .002" film thickness applicator, forming a tack-free film on air-drying overnight. Hard, flexible films are also obtained by baking for 10 minutes at 150° C. The air-dried film was unaffected after 5 hours in boiling water and after 18 hours in 5% aqueous sodium hydroxide at room temperature. The baked film was unaffected after 96 hours in 5% aqueous sodium hydroxide at room temperature and also after 1 hour in ethyl alcohol at room temperature. The film was unaffected after 45 minutes in glacial acetic acid but was softened slightly after 30 minutes in 10% aqueous ammonium hydroxide.

EXAMPLE IX

DPA co-esterified with linseed oil fatty acids

A mixture of 143 parts of a Diphenolic Acid prepared from phenol and levulinic acid and 122 parts of acetic anhydride in a 3-neck flask provided with a thermometer, a mechanical agitator, and a reflux condenser was heated to 135° C. for a period of 1 hour. To this mixture 104 parts of linseed oil fatty acids was added, the reflux condenser was turned downward for collection of the distillate and inert gas was introduced. The continuously agitated mixture was heated to 220° C. and maintained at this temperature for a period of 2 hours, during which time acetic acid formed during the reaction was collected. The product had an acid value of 20 and a softening point of 108° C.

This product had a viscosity of A–1 (Gardner Bubble Viscosimeter) and a color of 11 (Gardner-Holdt Color Scale) when dissolved in a mixture composed of equal parts of a heavy naphtha (boiling range 145–225° C. and having an aniline point of 60° C.) and commercial xylol to a 30% nonvolatile content. This solution was treated with .03% cobalt drier (based on nonvolatile content) and spread on glass panels with .002" film thickness applicator to form a tack-free film on air-drying for 20–30 minutes. Hard, flexible films are also obtained by baking for 10 minutes at 150° C. The air-dried film was unaffected after 5 hours in boiling water and also after 20 minutes in 5% aqueous sodium hydroxide at room temperature. The baked film was unaffected after 12 hours in 5% aqueous sodium hydroxide at room temperature and boiling toluene after 1 hour. It withstood glacial acetic acid, ethyl alcohol, 10% aqueous ammonium hydroxide, and diethyl ether at room temperature for 30 minutes.

EXAMPLE X

DPA co-esterified with oleic acid

A mixture of 286 parts of a Diphenolic Acid prepared from phenol and levulinic acid, 200 parts of glacial acetic acid, and 204 parts of acetic anhydride in a 3-neck flask provided with a thermometer, a mechanical agitator, and reflux condenser attached through a water trap was gradually heated to 192° C. with continuous agitation. To the molten mixture was added 140 parts of oleic acid and inert gas was introduced. The continuously agitated mixture was heated to 205° C. and maintained at 205–250° C. for a period of 5 hours, during which time the acetic acid was collected. The product had an acid value of 11.5 and a softening point of 101° C.

This product had a viscosity of D (Gardner Bubble Viscosimeter) and a color of 18 (Gardner-Holdt Color Scale) when dissolved in commercial xylol to a 30% nonvolatile content. This solution was then treated with .03% cobalt drier (based on nonvolatile content) and spread on glass panels with .002" film thickness applicator, forming a tack-free film on air-drying 15–20 minutes. Hard, flexible films are also obtained by baking for 10 minutes at 150° C. The air-dried film was unaffected after 24 hours in cold water and also after 5 minutes in 5% aqueous sodium hydroxide at room temperature. The baked film was unaffected after 3 hours in boiling water and also after 12 hours in 5% aqueous sodium hydroxide at room temperature.

It is to be understood that the above examples are intended to be illustrative only. They should not be construed as limiting the scope of the present invention since embodiments other than those specifically disclosed may be produced without departing from invention concept taught. It is desired, therefore, that only such limitations be imposed on the appended claims as are stated therein or required by the prior art.

What is claimed is:

1. A new composition of matter comprising an ester of a polyhydric phenol and at least one ethylenically unsaturated aliphatic monocarboxylic acid containing at least about 10 carbon atoms, said polyhydric phenol being a self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

2. The composition of claim 1 wherein the pentanoic acid consists essentially of 4,4 bis(4-hydroxyaryl)pentanoic acid wherein the hydroxyaryl radical is a hydroxyphenyl radical and is free from substituents other than alkyl groups of one carbon atom.

3. The composition of claim 1 wherein the pentanoic acid is 4,4 bis(4-hydroxyphenyl)pentanoic acid.

4. The composition of claim 3 wherein the unsaturated aliphatic monocarboxylic acid is oleic acid.

5. The composition of claim 3 wherein the unsaturated aliphatic monocarboxylic acid is linseed oil acids.

6. The composition of claim 3 wherein the unsaturated aliphatic monocarboxylic acid is dehydrated castor oil acids.

7. The composition of claim 3 wherein the unsaturated aliphatic monocarboxylic acid is soyabean oil acids.

8. The composition of claim 3 wherein the unsaturated aliphatic monocarboxylic acid is Chinawood oil acids.

9. A method for preparing a new composition of matter which comprises esterifying a polyhydric phenol with an ethylenically unsaturated aliphatic monocarboxylic acid containing at least about 10 carbon atoms, said polyhydric phenol being a self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

10. The method of claim 9 wherein the esterification is carried out in the presence of acetic anhydride.

11. A method for preparing a new composition of matter which comprises acetylating a polyhydric phenol and esterifying with an ethylenically unsaturated aliphatic monocarboxylic acid containing at least about 10 carbon atoms, said polyhydric phenol being a self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

12. A method for preparing a new composition of matter which comprises esterifying a polyhydric phenol with the acid chloride of an ethylenically unsaturated aliphatic monocarboxylic acid containing at least about 10 carbon atoms, said polyhydric phenol being a self-ester of a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

13. The method for preparing a new composition of matter which comprises co-esterifying, in the presence of acetic anhydride, a mixture of an ethylenic unsaturated aliphatic monocarboxylic acid containing at least about 10 carbon atoms and a hydroxyaryl pentanoic acid, said pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms.

References Cited in the file of this patent

Carothers: Collected Papers of Wallace H. Carothers on Polymerization, pages 86–87, vol. I, Interscience (1940). (Copy in Scientific Library.)

UNITED STATES PATENT OFFICE
CERTIFICATE OF CORRECTION

October 6, 1959

Patent No. 2,908,006

Sylvan O. Greenlee

It is hereby certified that error appears in the printed specification of the above numbered patent requiring correction and that the said Letters Patent should read as corrected below.

Column 4, Equation IV, the extreme right-hand portion of the formula relating to acetic anhydride should appear as shown below instead of as in the patent:

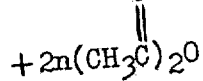

column 9, line 12, for "ethylenic" read -- ethylenically --.

Signed and sealed this 17th day of May 1960.

(SEAL)
Attest:

KARL H. AXLINE
Attesting Officer

ROBERT C. WATSON
Commissioner of Patents